United States Patent

[11] 3,626,951

| [72] | Inventor | Alexander Jan Vogelenzang<br>Wageningsestraat 28, Andelst, Netherlands |
|---|---|---|
| [21] | Appl. No. | 24,707 |
| [22] | Filed | Apr. 1, 1970 |
| [45] | Patented | Dec. 14, 1971 |
| [32] | Priorities | Apr. 3, 1969 |
| [33] | | Germany |
| [31] | | P 20 05 889.3; |
| | | Feb. 10, 1970, Germany, No. P 19 17 333.2 |

[54] THRESHING AND SEPARATING APPARATUS FOR COMBINES
12 Claims, 9 Drawing Figs.

| [52] | U.S. Cl. | 130/27 M |
|---|---|---|
| [51] | Int. Cl. | A01f 12/20 |
| [50] | Field of Search | 130/27 M, 27; 56/12.9, 13.1, 13.2, 16.5, DIG. 8, 122 |

[56] References Cited
UNITED STATES PATENTS

| 2,474,557 | 6/1949 | Templeton | 130/27 M |
| 2,822,812 | 2/1958 | Edwards | 56/DIG. 8 |
| 1,103,324 | 7/1914 | Sooy et al. | 56/12.9 |
| 2,069,735 | 2/1937 | Metcalf | 130/27 M |
| 2,275,392 | 3/1942 | Metcalf | 130/27 M |

*Primary Examiner*—Antonio F. Guida
*Attorney*—James E. Nilles

ABSTRACT: The threshing and separating device comprises a housing having a feed conduit extending from the vicinity of a cutting device and terminating at an issuing end within the housing. A curve merges said issuing end of said conduit with a thresher plate which is fixed within said housing. There are thresher blades on the side of said fixed thresher plate remote from said conduit. A rotary thresher plate is within said housing opposite said fixed thresher plate. Fan blades are fitted on said rotary thresher plate and extend towards but stop short of said fixed thresher plate to leave an annular gap opening into said housing. Lattice bars are concentrically disposed at radial intervals and pass through said blade.

INVENTOR:
ALEXANDER JAN VOGELENZANG
BY: James E. Nilles

INVENTOR:
ALEXANDER JAN VOGELENZANG

BY: James E. Nilles
ATT'Y

THRESHING AND SEPARATING APPARATUS FOR COMBINES

Behind the cutter device, harvester threshers are usually provided with conveyor means, formed as a rotary platform or a worm-conveyor disposed transversely of the direction of travel, which convey the cut crop to an elevator. This raises the crop to the inlet aperture of the adjacent thresher device, which in the conventional construction comprises a drum cooperating with a cage. The threshed grain is mostly removed through the cage to a sieve floor, and a mixture consisting of straw, chaff and residual grain is fed to an adjacent vibrator.

Since this separator device, usually consisting of sieves oscillating to and fro, requires a certain height and must to some extent lie below the thresher, the thresher device must be disposed relatively high, and the crop be raised correspondingly high. The crop must also be forced through the feed members into the thresher device between the drum and the cage. On its way from the cutting point to the thresher device, the crop is consequently subjected to repeated sharp changes of direction, and on this way must be repeatedly engaged by feed members. The speed of the feed members is so low that with the high capacity of modern harvester threshers, the crop is always fed to the thresher as a thick layer.

The invention described below is thus based on the consideration of providing guide means for the crop which can convey it from the vicinity of the cutting point, without using feed means and without sudden changes of direction, to the thresher device, where it is separated at increasing speed, and also of providing a construction for the thresher device and the following separator device which has a low center of gravity and can be disposed to the machine with economy of space.

A device is known with a stationary thresher comprising a residual thresher and separator, wherein the material sucked in through a guide conduit is fed to a dish- or cup-shaped rotary body whose inner wall is provided with guide blades. This bladed wheel is rotatably mounted in a housing opposite the mouth of the suction pipe and formed as a sifter. Together with residues of straw and ears, the grain released in this bladed wheel is entrained by the air in a spiral path against the inner wall of this housing, where the greater weight of the grain makes it drop down to where it can be removed.

One serious defect of this known construction is that the grain can only be incompletely separated from the crop fed through the suction pipe to the dish- or cup-shaped rotary body, since the relatively small internal volume of such a bladed wheel is unable to accept readily the often large quantity of straw, frequently long-stalked and tangled, which arises on cutting behind the mower. This quantity of straw prevents all the ears contained therein being completely threshed by the impact effects. This construction is also unsuitable for combined harvester threshers, since the various ears differ greatly in their degree of ripeness and dryness. But since it is a condition for the subsequent sieving of the mixture from the bladed wheel that the grain has already been separated, which for the reasons described is not the case, this construction cannot provide a high percentage of grain recovery. This serious defect is especially due to the dish-shaped form of the bladed wheel. The open connection between the suction pipe and the dish-shaped bladed wheel also affects the suction attainable.

It is known to form a thresher, to be incorporated for instance, in a harvester thresher, of two relatively rotatable superimposed thresher plates carrying thresher members and also provided with a deflector and chopping cutters, and to feed the harvested material coaxially to these thresher plates. The object is to combine the threshing and chopping processes in a single unit, wherein the centrifugal force from the rotation of the thresher plates is used to convey the material for threshing. But this known proposal makes no suggestion of using suction air to feed the crop from the vicinity of the cutting point to the thresher device, without any abrupt change of direction and without additional feed means, and of using this airstream to feed the crop between the thresher plates; nor is there any teaching on how to form the relatively movable thresher plates so that the threshed grain can be separated in the rotating thresher plates, with the mixture of residual grain, chaff and chopped straw emerging from the gap between the plates.

SUMMARY OF THE INVENTION

It is, accordingly, a general object of the present invention to overcome the aforementioned disadvantages. More particularly, it is an object of the present invention to provide a practically useful answer to the problem of providing conveyance of the crop from the cutting point to the thresher device, without using movable conveyor means, and a threshing device which gives effective loosening of the grain from the ears and the most complete possible separation and removal of the grains contained in the emerging mixture.

The threshing and separating device includes a bladed wheel which rotates in a housing formed as a sifter and to which the crop is fed through a conduit disposed coaxially of the bladed wheel. The grain is loosened on passage through the bladed wheel, and sifting of the resultant mixture is effected in the housing surrounding the bladed wheel. The feed conduit is located in the vicinity of a cutting device and passes thence via a curve to a fixed thresher plate provided on its inside with thresher blades. A rotary-bladed wheel is located in a spaced relation to the fixed thresher plate and acts as a thresher plate. Fan blades are provided on the wheel and an annular gap is provided at the periphery of the plates which open into the housing provided for sifting or separating of the mixture, said bladed wheel being provided with air passage holes, and with lattice bars concentrically disposed at radial distances from each other and passing through the blades.

A particularly effective construction is achieved by providing additional air blades on the reverse side of the rotary thresher plate; the air is not supplied to these through the central suction conduit for the crop, but on the side remote therefrom, if possible also by means of a central conduit. This air supply can be varied by throttles or like control means. At the periphery of the plates, the air impelled by these additional blades meets with air flowing along the rotary thresher plate and carrying the crop, thus increasing its energy.

Furthermore, it is advantageous to produce an additional airstream which is upwardly directed into the separation chamber from below with its direction of rotation opposite to that of the airstream forced by the blades of the rotary thresher plate into the separation chamber. The two airstreams moving in opposite directions then meet in the separation chamber, creating a strongly turbulent zone whereby the helical movement of the airstream issuing from the threshing gap is largely cancelled. In these air conditions, the grains with their low air resistance which emerge from the blade channels have a ready opportunity of being separated from the mixture and flung against the inner wall of the outer cylindrical housing, from which they drop and can be removed.

This oppositely directed airstream can be produced in various ways. In one possible embodiment, the fan blades provided on the reverse of the rotary thresher plate are aligned with the thresher blades, and at their periphery are surrounded by concentrically adjacent fixed guide blades, disposed with a direction opposite to that of the blades on the rotary thresher plate, and extending into the separation chamber. Another possibility is to provide the rear side of the rotary thresher plate with an additional circular blower whose drive is controlled to rotate it in a direction opposite to the rotary thresher plate. The airstream produced by this further circular blower is also fed upwardly into the separator chamber from below, in which it forms the required turbulence by coming into collision with the airstream produced by the thresher blades.

Figure 1:
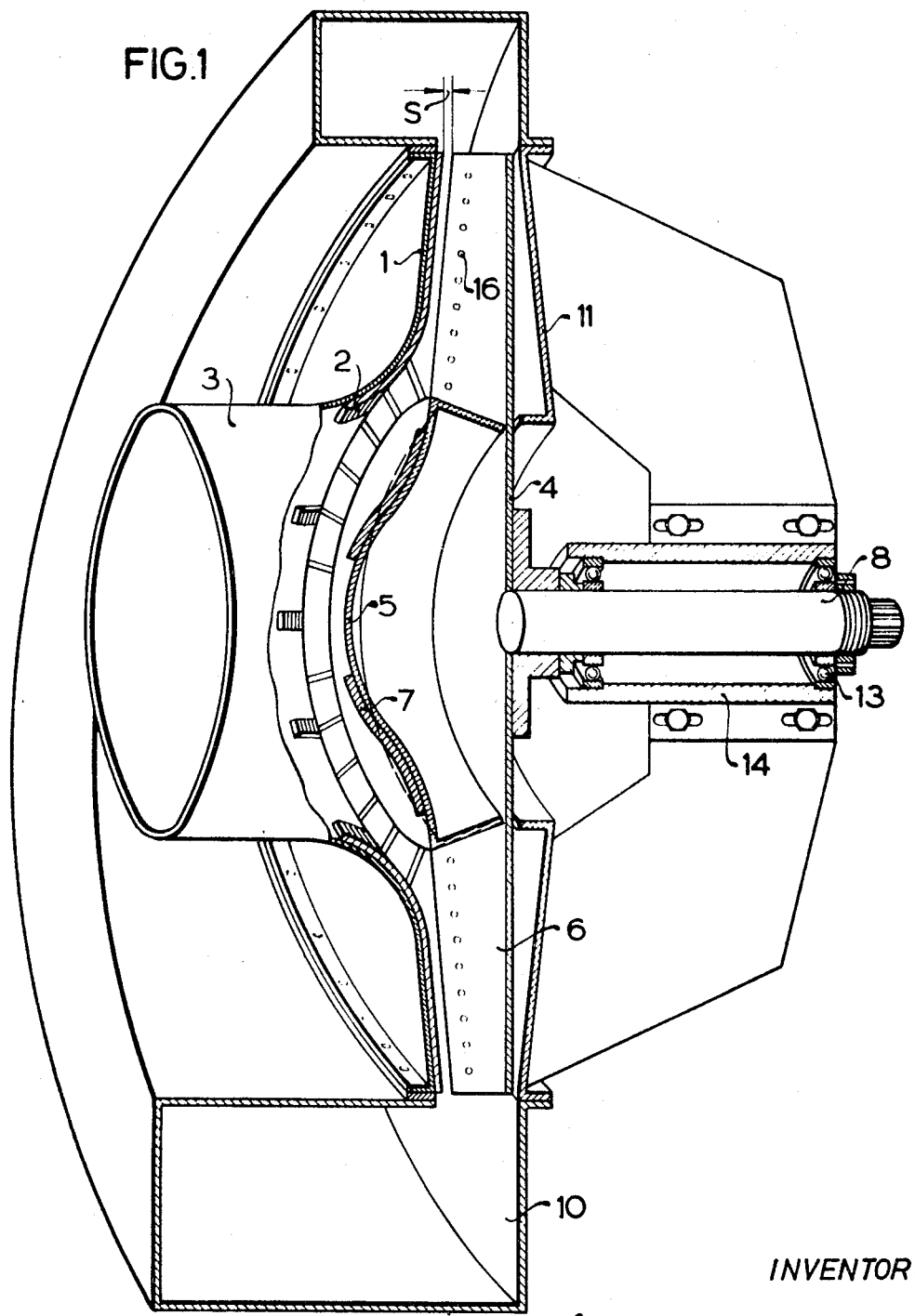
FIG. 1 is a longitudinal section through a first embodiment.

The embodiment shown in FIG. 1 has a fixed thresher plate 1 which is provided with thresher blades 2 and passes with smooth curves into a suction pipe. The fixed thresher plate 1 lies coaxially opposite a rotary thresher plate 4 which on the suction side has a dome-shaped guide body 5 whereon are affixed ribs 7. Adjacent the guide body 5 the thresher plate 4 is provided with blades 6. The two thresher plates 1 and 4 are separated by a gap S which can be varied by axial displacement of the shaft 8 carrying the rotary thresher plate 4.

The shaft 8 is supported by ball bearings 13 in an axially displaceable bearing housing 14. The suction pipe is connected to a feed channel 3 which extends to the vicinity of the cutting position for the crop, i.e. either to the vicinity of the cutter beam, to a platform behind a reciprocating cutter, or directly up to a rotary mower. The feed channel must naturally have the necessary shape and dimensions at its inlet end.

Figure 2:
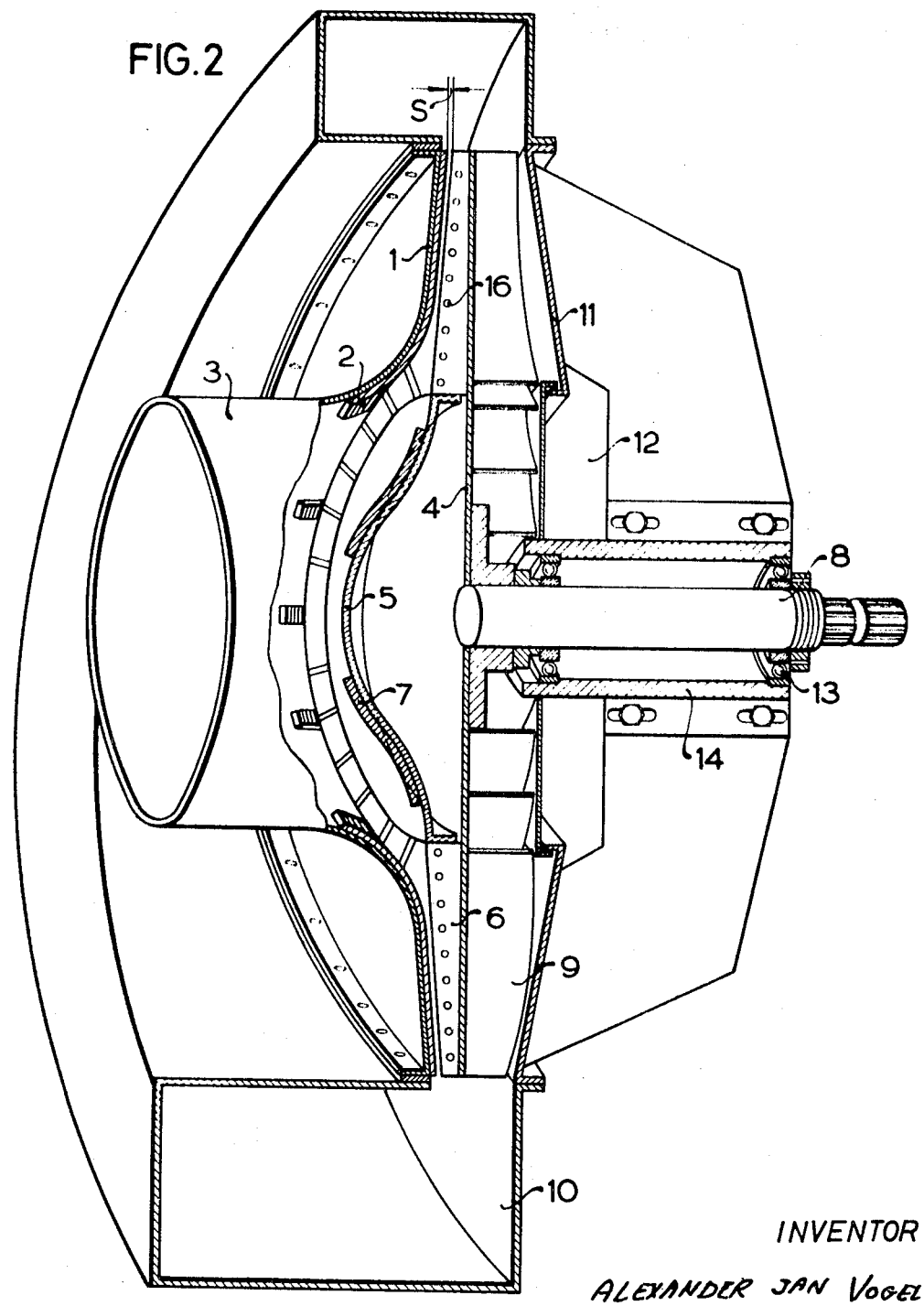
FIG. 2 is a longitudinal section through a second embodiment.

FIG. 2 differs from FIG. 1 in that on the rear of the rotary thresher plate 4 with the blades 6 there are disposed further fan blades 9 whereby when this plate rotates there is produced an additional airstream which when passing into the housing 10 surrounding the plate meets the other airstream at the edge of the plate.

Figure 3:
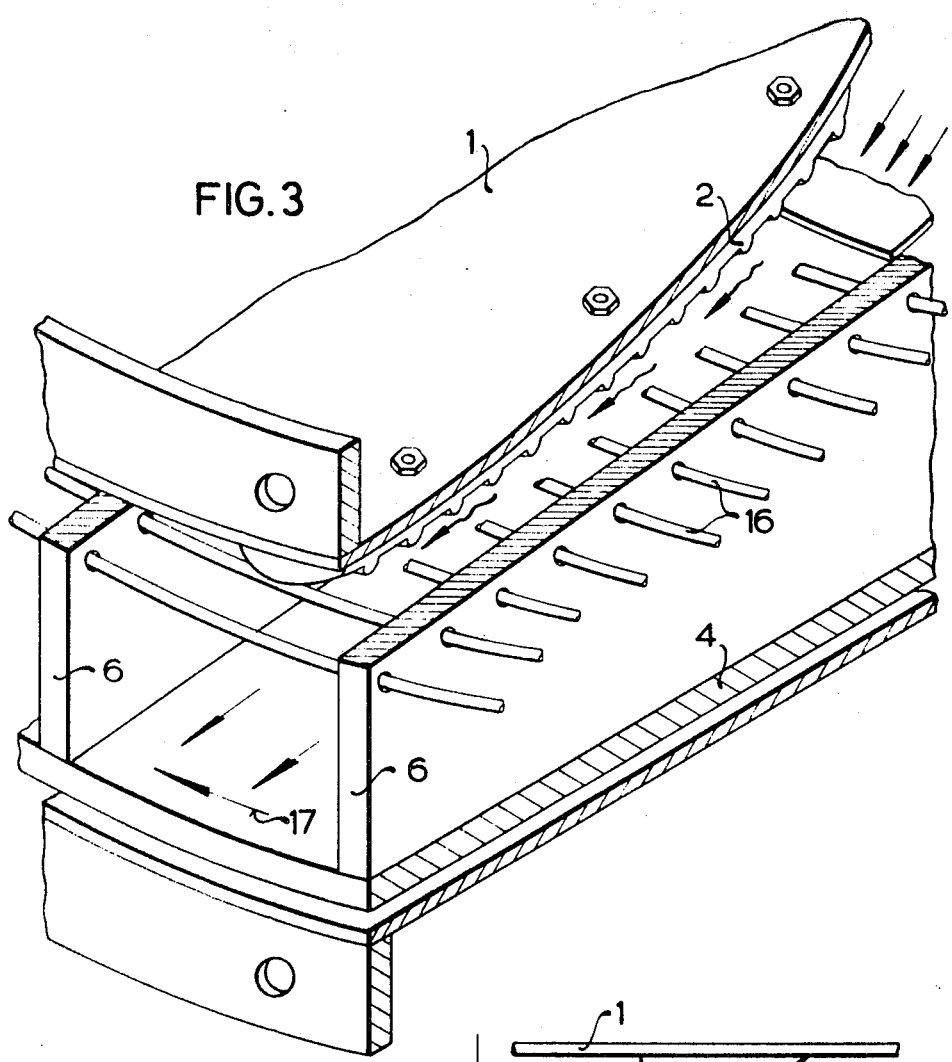
FIG. 3 is a perspective portion from the blades of the rotating threshing plate.

FIG. 3 is a perspective view of a section of the blades 6 turned through 90°. In these blades 6 are seen concentrically disposed annular lattice bars 16, indicated by dots in FIGS. 1 and 2. The bars lie opposite the fixed thresher blades 2 provided on the fixed thresher plate 1. The direction of the harvested crop passing through is indicated by small arrows; the larger arrow 17 shows the direction of rotation. The radial spacing of the lattice bars is such that the smaller separated pieces can pass through, while the larger pieces are retained.

Figure 4:
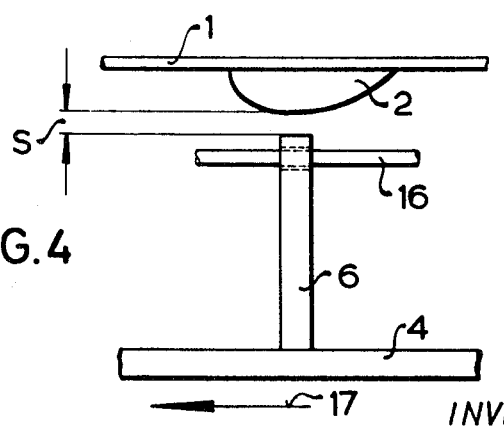
FIG. 4 is a partial section through the threshing plate.

FIG. 4 shows a part of the fixed plate 1, and below this the thresher blade 2 disposed at a distance S from one of the blades 6 disposed on the rotary thresher plate 4. The arrow 17 again shows the direction of rotation.

FIGS. 3 and 4 also apply in principle for blades 6 which also have separate fan blades disposed on the reverse side of the rotary thresher plate.

With the construction provided by the invention, the crop, raised by air suction from the cutting point, already opened out and brought to high speed, can be spread out in fan-fashion over the whole extent of the circle in the gap between the fixed plate 1 and the rotating thresher plate 4; the grain can be effectively threshed out in this thin layer. Since with a thresher plate 4 having a diameter of 1 meter, for instance, the outlet gap S has a length of 3.14 meters, the crop is always further opened out. The difference in speed between the fixed plate 1 and the rotary thresher plate 4 increases from a minimum at the center of the circle to a maximum at the outer periphery. This means that the dry and ripe ears are threshed at the inside of the circle, while the moist and less ripe grains are threshed nearer the periphery. This gives an initial separation of the grain, and prevents the drier grain released at the lower rotary speeds from being crushed. The grain falls partly between the lattice bars into the channels between the blades in the rotary thresher plate.

In order to provide this threshing effect extending over the entire surface of the thresher plates 1 and 4, the spaced-apart thresher plates must be provided with threshing members over their entire radial area. Consequently, the fixed thresher plate 1 is provided with thresher blades 2 from the outlet of the suction pipe, and the rotary thresher plate 4 is provided with thresher blades 6 even at its centrally disposed guide body 5, and also with apertures and with lattice bars 16 concentrically spaced radially apart.

The blades 6 of the rotary thresher plate 4 may be adjustable in position, so that they can assume a radial position or a position inclined to the direction of feed through the gap, so that the amount of air expelled by the blades 6 may be varied without changing the rotary speed. The blades 6 may also be made axially insertable into and out of the rotary thresher plate 4, so that the required suction can be provided if the rotary speed is changed.

For the same reason as the gap between the drum and the surrounding cage is made adjustable in drum thresher machines for threshing different crops, the gap in the device provided by the invention can be made variable by axially moving the rotary thresher plate 4.

There are two fundamental positions for the disposition of the thresher plates 1 and 4 — they can be placed in a vertical or a horizontal plane. With a vertical arrangement, the housing 10 forming the separator means and surrounding the thresher plates has a spiral course, to provide a sufficiently long path for the separation process. But this type of housing needs considerable space, is difficult to construct, and has the disadvantage that the centrifugal force acting on the mixture compresses the threshed product expelled from the gap in the lower part of the housing; this has a deleterious effect on separation.

Figure 5:
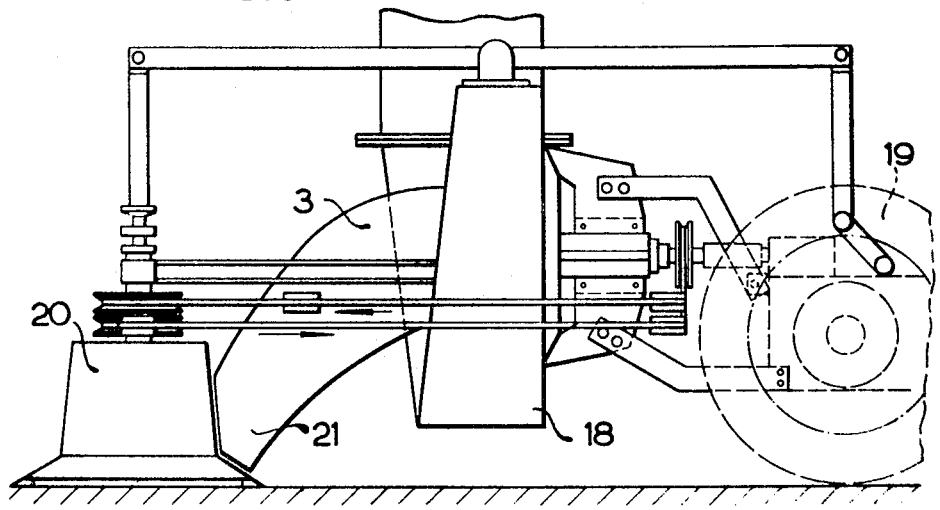
FIG. 5 is a side view of the threshing device in conjunction with a rotary mower.
Figure 6:
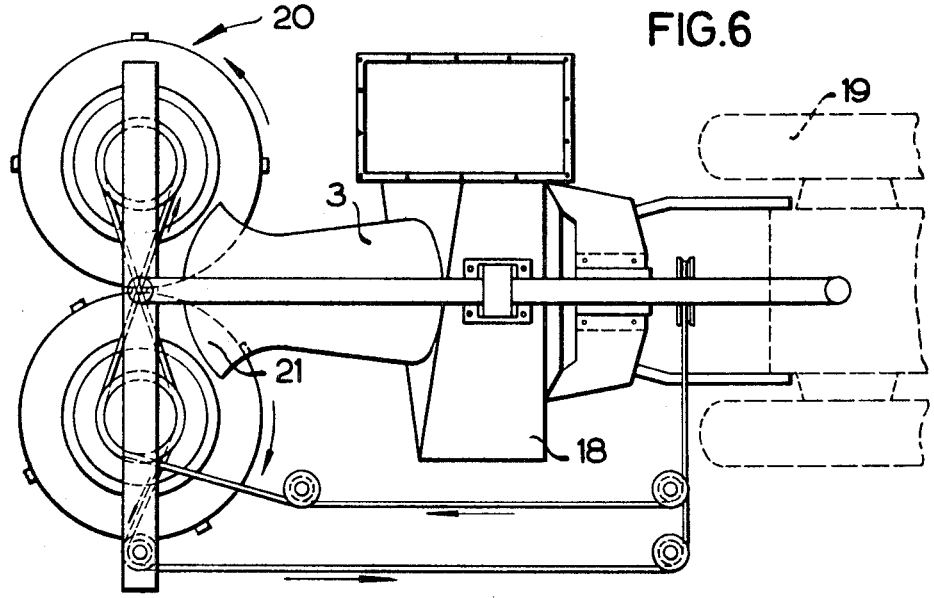
FIG. 6 is a corresponding plan view.

In FIGS. 5 and 6 the thresher device is shown in cooperation with a rotary mower. Here the thresher device 18 is shown at the rear of a tractor 19, together with a rotary mower 20. A feed channel 3 with its inlet end 21 is provided between the mower and the thresher device 18.

In distinction from the previously described embodiments, the outlet end of the feed channel 3 leading to the thresher device is vertically disposed, which thus has the consequence that material drops vertically on to the thresher plate.

Figure 7:
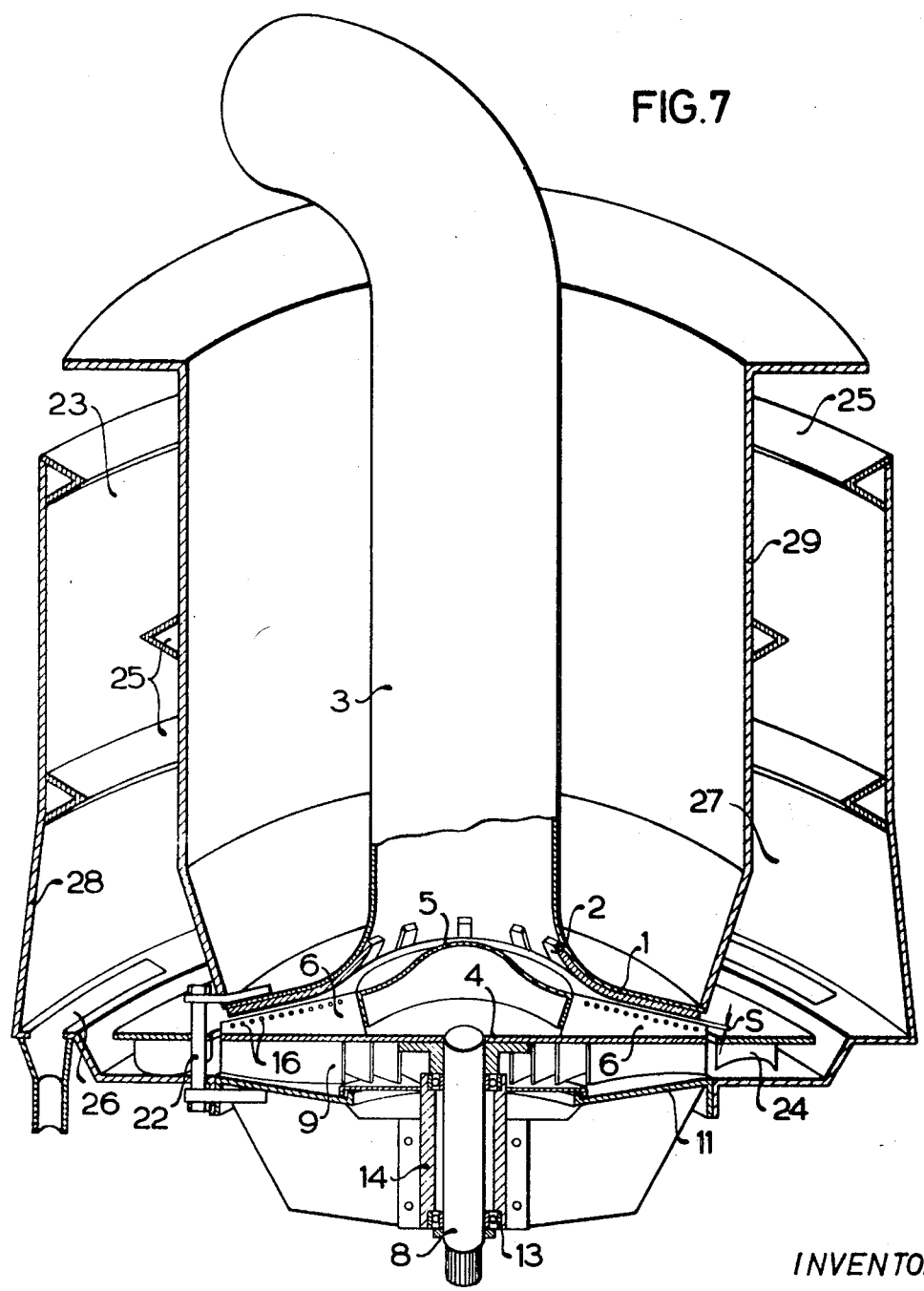
FIG. 7 is a cross section of the threshing and separating device in a further embodiment.
Figure 8:
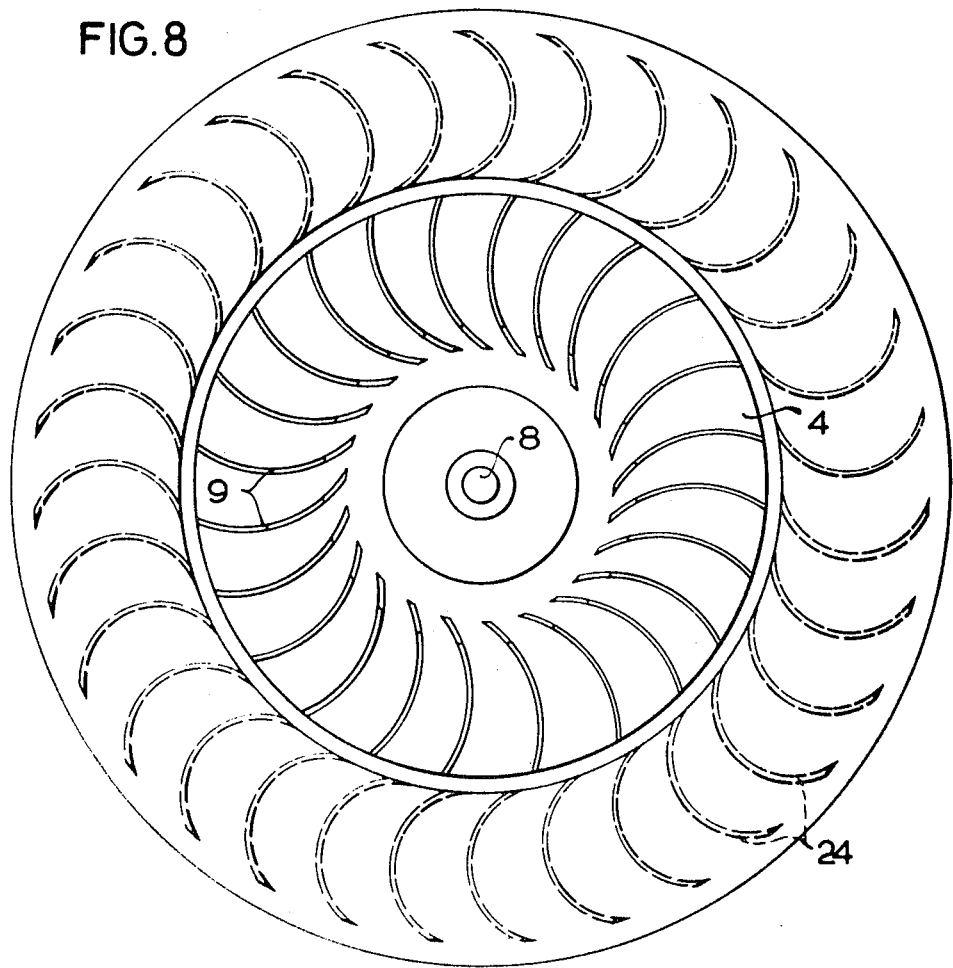
FIG. 8 is a view of the movable threshing plate from beneath.
Figure 9:
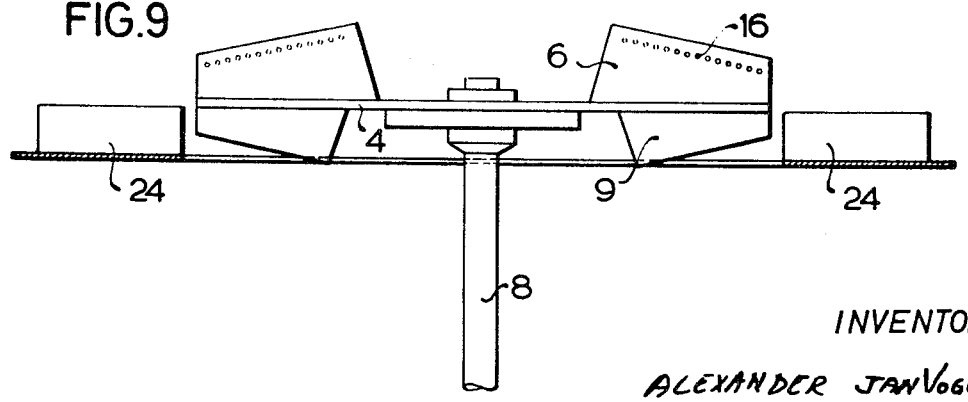
FIG. 9 is a side view of the movable threshing plate with additional fixed guide blades.

In the embodiment in FIG. 7 the separator houser comprises a vertically disposed cylindrical housing 28 concentrically surrounding the vertical outlet of the suction pipe 3 and also a cylindrical housing 29 disposed coaxially about this pipe outlet. These cylindrical housings 28, 29 define the separation chamber 23.

In its lower part the housing 28 is slightly broadened out conically, and the adjacent floor portion is provided with a sieve floor 26 which either consists of sections distributed round the periphery or else extends over the whole periphery. At the inside of the outer cylindrical housing 28 and/or at the outside of the inner cylinder 29 are provided projections 25 which consist of separate pieces or can be made of annular or helical shape.

The fixed thresher plate 1 carrying the suction pipe 3 and the inner drum housing 29 is connected to the housing 11 surrounding the rotary thresher plate 4 by a number of vertical bolts 22 disposed concentrically about the outlet of the gap S and whose number can be varied as desired.

The harvested material is drawn at a high speed, depending on the suction produced and the diameter of feed channel 3, through said channel 3 and the gap S, and enters the separation chamber 23 at this speed. The speed is greatly reduced in the annular space 23 surrounding by the cylinders 28 and 29 and leading up to the open air.

On the reverse side of the rotary thresher plate 4 are disposed fan blades 9 aligned with the thresher blades 6. At their periphery these fan blades 9 are surrounded by concentrically adjacent fixed guide blades 24 which open into the separator chamber 23. The airstream produced by the fan blades 9 and deflected by the guide blades 24 is, when it enters chamber 23, consequently moving in the opposite direction to the airstream blown by the thresher blades 6 into the separation chamber.

In order to reduce this separation chamber 23 to internal dimensions favoring the separation process, and which also determines the speed of the flowing air, there is provided between the vertical outlet of the suction pipe and the said cylindrical housing 28 an intermediate cylinder 29 connected to the fixed thresher plate 1, so that the annular separation chamber is bounded by the inner and outer cylinders, and these two cylinders are disposed relative to the thresher device so that they extend in general above the horizontal plane lying through the outlet of the said threshing gap S. At its lower outer edge, the outer cylinder 28 is provided with a sieve floor 26 for removing the threshed grain; the lower part of the cylinder containing this sieve floor is preferably broadened out conically towards the sieve floor. At least one of the facing surface walls of the cylindrical housings bounding the separation chamber can be provided with individual projections 25 or projections joined in annular or spiral form, whereby the air flowing through the separation chamber and containing the threshed mixture is made turbulent, which aids separation of the grain.

The fixed thresher plate 1 and the housing supporting the rotary plate 4 are connected together by a number of bolts 22 disposed concentrically around the threshing gap outlet. The straw stalks flung at high speed out of the gap after the threshing process strike these transversely disposed bolts at high speed, and are thus broken into smaller pieces and more completely loosened apart. The number of these bolts distributed around the periphery is variable. Even with three or four of such bolts, the length of the expelled straws is considerably less. The outer cylindrical housing may also comprise a material which is deformable and hence variable in diameter. The width of the annular gap in the separation chamber and hence the airflow rate can be adjusted by changing the diameter of the outer cylindrical housing.

The mixture entering the separation chamber 23 endeavors to reach the outlet thereof by the shortest route, and hence moves in a spiral path. It is then difficult for the grain contained in the mixture to be separated; it is thus carried into the atmosphere and lost, reducing the amount of threshed grain recovered. To avoid this disadvantage, a new route is proposed.

This further embodiment of the invention is based on the consideration that the mixture of straw, chaff and grain flung out from the gap in a horizontal plane must remain above the grain and chaff already separated in the thresher device and emerging from the blade channels, and that a turbulent area must be produced, through which the grain, having a lower air resistance, freely passes, while all the other components of the mixture are entrained by the incoming airstream, whereby any grain still entrained can be separated out by the sifting principle, whereupon it falls by gravity and can also be removed through the sieve floor.

The mixture of grain, pieces of straw and chaff mixed with air which is flung radially out of the thresher device gap S with a tangential velocity component trends to reach the outer casing surface of the separation chamber in spiral motion. Although the cross-sectional area of the separator chamber 23 is very much greater than that of the suction pipe 3, so that the airspeed drops, because of the tangential velocity component, this speed is relatively high and hence no air sifting takes place. Because of the additional stream of secondary air blown from below in accordance with the invention, with its oppositely directed velocity component, the tangential velocity components largely cancel each other out; the absence of circulatory forces then results in an upward rotation-free flow inside the separation chamber, with the velocities uniformly distributed over the entire cross section of the chamber. The outlet velocity is determined by the ratio of air capacity to housing diameter, and can be adjusted so that no grain is entrained by the airstream flowing towards the outlet and bearing straw and chaff. The grains emerging from the blade channels, which have a lesser air resistance, pass unimpeded through the turbulent zone and are flung against the wall, whence they fall under gravity to the sieved floor. The grain carried upwards in the separator chamber by airstream falls down (under the sifting principle which has again started to operate) because of the low airspeed, and joins the directly centrifuged grain.

The vertical feed of the crop to the thresher device, the disposition of the thresher plates 1 and 4 in a generally horizontal plane with the consequent ability to preseparate the threshed material, the disposition of the separation chamber 23 concentrically of the suction pipe 3, and the carrying out of the separation process using a secondary airstream opposite in its direction of rotation to the airstream blown by the blades of the rotating thresher plate 4 into the separation chamber, all permit a very high yield of perfectly separated grain from the harvest. The construction is simple and not likely to break down, since apart from the rotating thresher plate, no movable parts are present. The concentrically surrounding cylindrical housings forming the separator device, which are made of thin sheet if not of deformable material, have little weight. In addition, the separator device is self-cleaning, since threshing residues cannot adhere to the vertical casing surfaces of the surrounding cylindrical housings. Also, the annular space between the ends of the suction pipe and the inner cylindrical housing can be used as a grain reservoir.

The previously mentioned method of separating and removing a required component from a mixture containing several components differing in specific gravity, by the deliberate feeding into a separation chamber of two airstreams opposite in flow direction can be applied not only to threshing residues as described but equally well to other mixtures which contain a number of components which differ in their specific gravity and in air resistance.

I claim:

1. A threshing and separating device comprising a housing a feed conduit having an issuing end extending into said housing, a fixed thresher plate supported within said housing below said issuing end of said feed conduit and having a central opening aligned with the issuing end of said feed conduit, thresher blades on the side of said fixed thresher plate remote from said conduit, a rotary thresher plate, supported within said housing opposite said fixed thresher plate, said rotary thresher plate having a plurality of fan blades mounted on said rotary thresher plate and extending towards but stopping short of said fixed thresher plate to leave an annular gap opening into said housing, said fan blades providing a primary flow of air through said gap, lattice bars concentrically disposed at radial intervals and passing through said fan blades, and means operatively associated with said rotary threshing plate for directing additional air across said annular gap in the opposite direction to the primary flow of air through said gap.

2. A threshing and separating device according to claim 1, wherein said rotary thresher plate includes a guide member projecting centrally into said issuing end of said conduit, and ribs in the conduit-facing side of said guide member.

3. A threshing and separating device according to claim 1 including means for varying the position of said blades on said rotary thresher plate.

4. A threshing and separating device according to claim 1, including means for axially displacing said rotary thresher plate to alter the width of said gap between said fixed and rotary thresher plates.

5. A threshing and separating device according to claim 1, including additional fan blades disposed on the reverse side of said rotary thresher plate.

6. A threshing and separating device according to claim 5, in which said fixed and rotary thresher plates are disposed horizontally, and said issuing end of said feed conduit is disposed vertically, and said housing is of substantially cylindrical shape and is coaxial with said issuing end of said feed conduit.

7. A threshing and separating device as claimed in claim 6 including an inner cylinder connected to said fixed thresher plate and being spaced inwardly of said housing to define a separation chamber around the outlet of said annular gap and said housing including a sieve floor for removing threshed grain from said separation chamber.

8. A threshing and separating device as claimed in claim 7, including projections on at least one of the oppositely disposed surfaces of said inner cylinder and outer housing.

9. A threshing and separating device as claimed in claim 7, in which said housing is conically outwardly broadened towards said sieve floor.

10. A threshing and separating device as claimed in claim 6, including a number of bolts mounted on said housing and disposed concentrically around the periphery of the annular gap.

11. The device according to claim 6 wherein said additional air directing means includes a number of fan blades provided on the reverse side of the rotary thresher plate and a number of fixed guide blades around the periphery of said thresher plate having a direction opposite to said fan blades, and extending into said separation chamber.

12. The device according to claim 6 including an additional circular blower rotating opposite to the thresher plate, and with its blade channels terminating in the separation chamber.

* * * * *